United States Patent Office 3,637,828
Patented Jan. 25, 1972

3,637,828
2-HYDROXY - 3,5,6 - TRICHLOROMANDELIC ACID AND A PROCESS FOR THE MAKING THEREOF
Ulrich Holtschmidt and Eberhard Hofmann, Essen, Germany, assignors to Th. Goldschmidt A.G., Essen, Germany
No Drawing. Filed Apr. 21, 1969, Ser. No. 818,097
Claims priority, application Switzerland, May 6, 1968, 6,726/68
Int. Cl. C07c 65/02
U.S. Cl. 260—521 A
7 Claims

ABSTRACT OF THE DISCLOSURE

α-(2-hydroxy-, 3,5,6-trichloro-) phenylglycol-acid of the structural formula

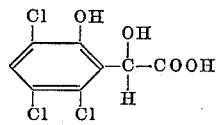

The new acid has pronounced biocidal activity.

DESCRIPTION OF PRIOR ART

Several known halogenphenolcarboxylic acids corresponding to the following Formula II and their derivatives have gained considerable economic importance as insecticides, herebicides or fungicides.

In this Formula II

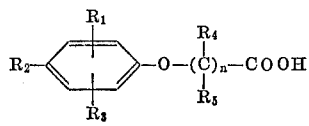

$R_1$, $R_2$, and $R_3$ designate hydrogen, chlorine or bromine while $R_4$ and $R_5$ stand for hydrogen or lower alkyl. $R_1$, $R_2$ and $R_3$ cannot, however, all be hydrogen at the same time. The symbol $n$ has a suitable numerical value such as 1, 2, 3 or higher. These prior art acids thus do not contain any free phenolic OH-group and, with regard to their bactericidal effect, are not very potent.

Herbicides and fungicides have also been described which correspond to compounds represented by the following Formulae III and IV:

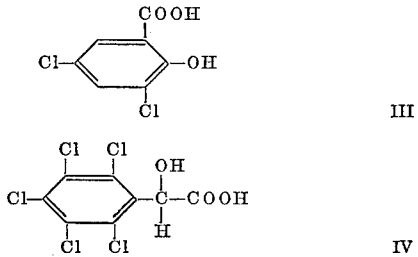

The prior art compounds of Formulae III and IV have not been disclosed as possessing significant bactericidal properties (see Japanese patent applications 8238-67 of Sept. 14, 1964 and 104-68 of Nov. 22, 1965).

The halogen phenols, from which the compounds of Formulae I, II and III are derived, are very active bactericides and fungicides. However, from a practical point of view, the use of such compounds is severely limited and connnected with considerable disadvantages due to the fact that they cause pronounced irritations on the skin and mucous membranes. Further, such prior art compounds have a penetrating, offensive odor, poor water solubility and, moreover, are readily inactivated by surface active substances, such as cationic, anionic or non-ionic tensides.

SUMMARY OF THE INVENTION

The present invention relates to a novel organic acid which has pronounced biocidal, to wit, insecticidal, herbicidal, fungicidal and bactericidal activity, without, however, causing any significant irritation upon contact with the skin or mucous membranes. The structure of the new acid is represented by the following formula

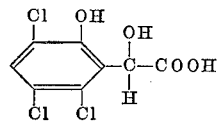

and may be designated as α-(2-hydroxy-, 3,5,6-trichloro-) phenylglycol-acid.

The novel acid, in addition to its superior biocidal characteristics and its insignificant irritating effect, is furthermore characterized by negligible odor, excellent water solubility and compatibility with surface active agents. The biocidal activity of the new acid is thus not materially affected by the presence of tensides.

In view of the beneficial characteristics of the new acid, it is superiorly suitable for disinfecting purposes, for the preservation of tenside-containing preparations, for the treatment and prophylaxis of fungus infections occurring in humans and animals and also as virucidal agent.

The invention is also concerned with a process of preparing the novel compound. According to this aspect of the invention, 2,4,5-trichlorophenol is reacted with glyoxylic acid in the presence of a catalyst such as, for example, concentrated sulfuric acid, phosphoric acid or p-toluenesulfonic acid. The reaction between the 2,4,5-trichlorophenol and the glyoxylic acid is advantageously effected in a molar proportion of 1:1. The catalytically active acids, such as $H_2SO_4$, $H_3PO_4$ or p-toluenesulfonic acid serve a double function, because they act not only as catalysts but also as waterbinding agents. If desired, thioglycolic acid may be used as an additional catalyst. Although, as stated above, the reaction between the 2,4,5-trichlorophenol and the glyoxylic acid is advantageously carried out in molar proportions, the reaction can also successfully be performed in the presence of an excess of the glyoxylic acid. This in fact increases the yield of the inventive compound, calculated on the trichlorophenol. Unreacted trichlorophenol can be readily removed, for example, by extraction of the reaction product with cyclohexane, Decalin, benzene, carbon tetrachloride or some other suitable extracting agent.

The invention will now be described by several examples, it being understood, however, that these examples are given by way of illustration and not by way of limitation and that many changes may be effected without affecting in any way the scope and spirit of the invention as recited in the appended claims.

EXAMPLE 1

Preparation of the new acid 150 grams (1 mole) of aqueous glyoxylic acid of 50% concentration were fed to a 500 ml. four neck flask fitted with stirrer, reflux cooler, vacuum connection and thermometer. The acid was liberated of most of its water content in vacuum and at a temperature not exceeding 40° C. 197.5 g. (1 mole) of 2,4,5-trichlorophenol, 50 ml. of concentrated sulfuric acid and 1 g. of thioglycolic acid (as catalyst) were then added to the flask. The reaction was subsequently permitted to proceed for 8 hours at a temperature of 60° C. After cooling, the reaction mixture was poured on ice, whereupon filtration was effected with subsequent washing with water. The filter residue was dried and thereafter extracted with Decalin. The extraction with the Decalin was carried out for five hours at about 50° C. and the amount of Decalin used was about twice that of the filter residue. A yellow, solid residue remained, which upon recrystallization from water yielded white needles of aromatic odor. The melting point (uncorrected) was 164° C. and the yield was 190 g.=70% of the theoretical amount.

*Analysis.*—Calculated for (percent): C, 35.3; H, 1.8; Cl, 39.2; Found (percent): C, 35.4; H, 1.8; Cl, 39.0.

IR-spectrum

The IR-spectrum is in conformity with the structure of Formula I, which was confirmed by comparison with the IR-spectra of 2,4,5-trichlorophenol and mandelic acid.

Solubility

Due to the relatively high solubility of the acid, a 1% aqueous solution of the compound of a pH value of 8 can be easily prepared with the addition of the necessary amount of a suitable alkali such as NaOH or the like. Such an aqueous preparation was employed for the suspension and eye irritation tests hereinafter described.

EXAMPLE 2

Bacteriological tests (1) Suspension test.—Test substance: An aqueous solution of 1% concentration of the inventive compound, the pH value of the solution having been adjusted to 8 by the addition of NaOH.

| Tested bacteria | Concentration of active substance in percent | Action time in minutes | | | | | |
|---|---|---|---|---|---|---|---|
| | | 1 | 2 | 5 | 10 | 20 | 30 |
| Staphylococcus aureus | 1 | + | + | − | − | − | − |
| | 0.5 | + | + | + | + | + | − |
| | 0.1 | + | + | + | + | + | + |
| Pseudomonas aeruginosa | 1 | − | − | − | − | − | − |
| | 0.5 | + | + | + | + | − | − |
| | 0.1 | + | + | + | + | + | + |
| Proteus vulgaris | 1 | − | − | − | − | − | − |
| | 0.5 | + | + | + | + | − | − |
| | 0.1 | + | + | + | + | + | + |
| Escherichia coli | 1 | − | − | − | − | − | − |
| | 0.5 | + | + | + | − | − | − |
| | 0.1 | + | + | + | + | + | + |
| Salmonella dublin | 1 | − | − | − | − | − | − |
| | 0.5 | + | + | + | − | − | − |
| | 0.1 | + | + | + | + | + | + |
| Candida albicans | 0.1 | − | − | − | − | − | − |
| | 0.05 | − | − | − | − | − | − |
| | 0.01 | + | + | + | − | − | − |
| | 0.005 | + | + | + | + | − | − |
| | 0.001 | + | + | + | + | − | − |

NOTE.—+=growth; −=destruction.

The very pronounced bactericidal activity of the new acid is clearly recognized from the suspension test, it being noted that the activity is particularly strong in respect to gram-negative bacteria.

(2) Investigation of the bacteriostatic activity by test tube testing.—Test substance: An aqueous solution of 1% concentration of the inventive acid, the pH of the solution having been adjusted to a value of 10 by the addition of sodium hydroxide.

Inocculated germ number: About $10^5$–$10^6$ germs per ml. of nutrient medium.

| Tested bacteria | Concentration of active substance in percent | Activity |
|---|---|---|
| Staphylococcus aureus | 0.1 | − |
| | 0,05 | − |
| | 0.01 | + |
| Pseudomonas aeruginosa | 0.1 | − |
| | 0.05 | + |
| | 0.01 | + |
| Proteus vulgaris | 0.1 | − |
| | 0.05 | − |
| | 0.01 | − |
| | 0.005 | + |
| Escherichia coli | 0.1 | − |
| | 0.05 | − |
| | 0.01 | + |
| Salmonella dublin | 0.1 | − |
| | 0.05 | − |
| | 0.01 | + |
| Candida albicans | 0.1 | − |
| | 0.05 | − |
| | 0.01 | − |
| | 0.005 | − |
| | 0.001 | + |

NOTE.—+=growth; −=no growth.

Subcultures were prepared after 3 days. It was observed that in the "−" cases no further growth took place.

EXAMPLE 3

(3) Investigation of the preserving activity of the inventive compound.—An aqueous polyoxyethylenesorbitaneoleate solution of 10% strength and containing 0.1% of the new acid, was adjusted to a pH value of 10 by the addition of $NH_3$. The solution was inoculated with a mixed culture of *Staphylococcus aureus, Pseudomonas aeruginosa, Proteus vulgaris* and *Escherichia coli*. The change in the germ number was determined daily. It was found that the germ number within a few days was reduced to 0 and remained at the 0 value.

EXAMPLE 4

(4) Testing of the irritating effect on a rabbit eye.—This test was carried out according to the procedure disclosed by J. H. Draize and E. A. Kelley, in Drug and Cosmetic Industry, Volume 71, 1952, pages 36–37 and 118–120.

Test substance: An aqueous solution of the new acid of 1% concentration, the pH of the solution having been adjusted to a value of 8 by the addition of NaOH.

| | | Rabbit No. | | | | | | Average value |
|---|---|---|---|---|---|---|---|---|
| | | 1 | 2 | 3 | 4 | 5 | 6 | |
| 1. Day | A | 1 | 1 | 1 | 1 | 1 | 1 | |
| | B | 0 | 0 | 0 | 0 | 0 | 0 | |
| | C | 1 | 1 | 0 | 0 | 0 | 0 | |
| | | 2X2=4 | 2X2=4 | 1X2=2 | 1X2=2 | 1X2=2 | 1X2=2 | 2.7 |
| 2. Day | A | 0 | 0 | 0 | 0 | 0 | 0 | |
| | B | 0 | 0 | 0 | 0 | 0 | 0 | |
| | C | 0 | 0 | 0 | 0 | 0 | 0 | 0 |

The foregoing table clearly indicates that the new acid has an extremely insignificant if not negligible irritating effect.

What is claimed is:

1. The compound of the formula

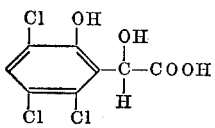

2. A process of preparing the compound depicted by the formula

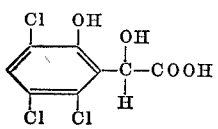

3. The process as claimed in claim 2, wherein the reaction product obtained in the reaction is extracted with an extracting agent, said extracting agent being cyclohexane, Decalin, benzene or carbon tetrachloride.

4. The process as claimed in claim 2, wherein said 2,4,5-trichlorophenol and the glyoxylic acid are employed in the molar ratio of 1:1.

5. The process as claimed in claim 2, wherein the reaction is carried out with an excess of glyoxylic acid.

6. The process as claimed in claim 2, wherein in addition to said acidic catalyst, a further catalyst being thioglycolic acid is added to the reaction system.

7. The process as claimed in claim 2, wherein the reaction is carried out at elevated temperature of about 60° C.

References Cited

UNITED STATES PATENTS 3,277,160  10/1966  Weil et al. _____ 260—501

LORRAINE A. WEINBERGER, Primary Examiner

E. J. GLEIMAN, Assistant Examiner

U.S. Cl. X.R.

424—317